US006625277B1

(12) United States Patent
Furlong

(10) Patent No.: US 6,625,277 B1
(45) Date of Patent: Sep. 23, 2003

(54) LOW CURRENT SIGNAL COMPRESSION CIRCUIT

(75) Inventor: Jeffrey A. Furlong, Rogers, MN (US)

(73) Assignee: Unicon Incorporates, Minneapolis, MN (US)

( * ) Notice: Subject to any disclaimer, the term of this patent is extended or adjusted under 35 U.S.C. 154(b) by 0 days.

(21) Appl. No.: 09/271,195

(22) Filed: Mar. 17, 1999

(51) Int. Cl.[7] ............................................. H04M 1/00
(52) U.S. Cl. .................................. 379/388.03; 381/72
(58) Field of Search ..................... 379/388.03, 390.01, 379/395, 388.07; 381/72, 83, 93, 57

(56) References Cited

U.S. PATENT DOCUMENTS 4,782,524 A * 11/1988 McQuinn et al. ........... 379/395
5,138,664 A * 8/1992 Kimura et al. ................ 381/72

* cited by examiner

Primary Examiner—Forester W. Isen
Assistant Examiner—Jefferey Harold
(74) Attorney, Agent, or Firm—Paul L. Sjoquist

(57) ABSTRACT

A low voltage and low current compression circuit for connection between a telephone receiver and a telephone headset earphone, the circuit having an operational amplifier with variable gain, the gain being determined by the output signal level and by the presence or absence of transient signal spikes generated by the telephone receiver. The amplifier is connected to a voltage clipper circuit and a JFET feedback device, wherein the JFET operates as a variable resistance to control the signal feedback.

5 Claims, 1 Drawing Sheet

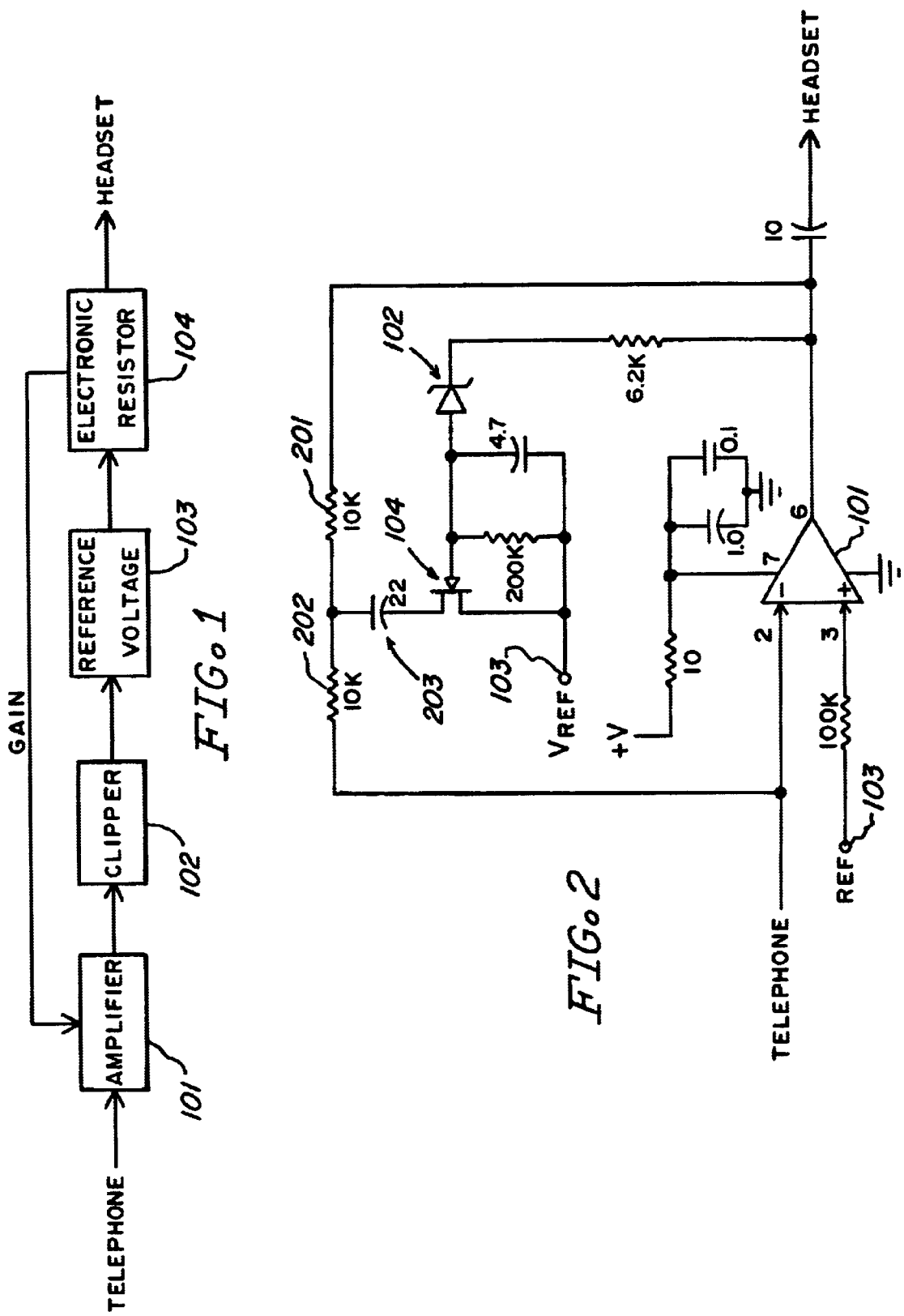

LOW CURRENT SIGNAL COMPRESSION CIRCUIT

BACKGROUND OF THE INVENTION

This invention relates generally to circuits for driving audio acoustic energy devices; more particularly, the invention relates to a circuit which limits the acoustic energy presented to a telephone headset connected to a commercially-available telephone receiver.

A feature of the invention is that it uses very little current from the telephone battery for performing the function of limiting the acoustical energy presented to the telephone headset. In commercial telephone systems the level of acoustical energy delivered to the user's ear is dependent on many variables, including the quality of the interconnecting electrical lines, the quality of the many electrical junctions and wiring connections between the sender and receiver, the quality of the amplification circuits along the way, and the existence of random or repeatable noise sources and sources of acoustic interference. In order to protect the ear of the user, it is desirable to provide a circuit for limiting the maximum acoustic energy which can be delivered to the ear. The present invention is concerned with this type of protection, afforded to users of telephone headsets having an independent acoustic transducer as an earpiece, and which is connectable to an ordinary, commercially-available telephone receiver in substitution for the normal handset associated with such a receiver.

SUMMARY OF THE INVENTION

A low voltage compression circuit serving as a feedback loop in a signal transmission path between a telephone receiver and a telephone headset earphone. The circuit is connected as a feedback loop in the operational amplifier circuit which amplifies the received acoustic energy from the telephone receiver; as the operational amplifier output signal increases beyond a predetermined output level, a portion of the operational amplifier circuit output signal is directed to a semiconductor switching circuit to increasingly turn on a shunt signal to the amplifier negative feedback input terminal, thereby increasing the negative feedback (decreasing the operational amplifier gain) and reducing the operational amplifier output signal.

It is a principal object of the present invention to provide a variable gain circuit in a telephone operational amplifier, which operates under very low voltage and current constraints, to thereby conserve energy drain from the telephone system battery and greatly extend battery life.

It is another object of the invention to provide a variable gain circuit in a telephone headset signal path, for limiting the acoustical energy presented to the headset.

Other objects and advantages of the invention will become apparent from the following specification, and with reference to the drawings and appended claims.

BRIEF DESCRIPTION OF THE DRAWINGS

FIG. 1 shows a block diagram of the invention in a telephone circuit; and

FIG. 2 shows a schematic diagram of the invention.

DESCRIPTION OF THE PREFERRED EMBODIMENT

Referring first to FIG. 1, there is shown a block diagram illustrating the invention in connection with a conventional telephone headset circuit. The circuits of FIG. 1 are interposed between a telephone receiver and the telephone headset earphone, so as to operate on the audio signal transmitted from the receiver to the earphone. The signal "telephone" shown in FIG. 1 is connected to the input of an operational amplifier 101, which amplifies the signal to a magnitude suitable for driving the earphone. The amplifier 101 output signal is clipped in a clipper circuit 102, to remove temporary transient or "noise" signals which might be harmful to the user's ear, and the clipped signal is compared to a reference voltage level 103 so as to maintaining the clipped signal within a range of values deemed to be satisfactory for application to the earphone. The reference voltage 103 is connected to an electronic resistance 104, which controls a feedback signal back to the operational amplifier 101, thereby controlling the gain of the operational amplifier 101 to continuously produce an audio output signal within the acceptable range of signal values. The resultant signal is applied to a "headset" earphone which is closely positioned to the user's ear.

The detailed circuit diagram of the invention is shown in FIG. 2. The "telephone" signal is applied to the negative input terminal 2 of an operational amplifier, such as a type NE5230, manufactured by Phillips Semiconductor. The positive input terminal 3 of the operational amplifier is connected via a resistor to a reference voltage 103, which is designated "$V_{ref}$". The operational amplifier 101 output signal is presented at terminal 6. The amplification characteristics of the operational amplifier 101 are such that the output terminal signal is determined by the difference voltage presented at terminals 2 and 3 of the amplifier.

A portion of the output signal is connected via a conventional feedback path comprising resistors 201 and 202 to the input terminal 2. The output signal is also connected via a clipper Schottky diode circuit 102 to the gate terminal of a JFET device, which behaves as an electronic resistor 104. The clipper Schottky diode circuit 102 applies voltage which exceed the Schottky firing voltage to the JFET gate terminal, and this applied voltage causes the JFET to pass current. The current it passes is bled through capacitor 203, connected at the midpoint of the feedback resistors 201 and 202, to the reference voltage 103, thereby producing a smaller output signal. The output signal is connected to the headset earphone via an electrolytic capacitor 205.

In operation, the gain through the operational amplifier circuit 101 is typically in the range of 10:1. The output voltage signal is held to a maximum swing of about 250 millivolts and the current drain is correspondingly low. This circuit enables the control of audio voltage level transmitted to a headset earphone so as to limit the acoustic energy delivered to the earphone at a very small cost in battery drain.

The foregoing description of a preferred embodiment of the invention is intended to be illustrative and not limiting as to the scope of the invention. The full scope of the invention will be appreciated upon reading the specification together with the appended claims, and with reference to the drawings.

What is claimed is:

1. A low voltage compression circuit interposed in the signal path between a telephone receiver and a telephone headset earphone, comprising:

a) an operational amplifier having a pair of input terminals comprising a negative input terminal and a positive input terminal, and an output terminal, the amplifier having the amplification characteristic such that the voltage at the output terminal is determined by the difference between the voltage applied to the positive input terminal and the negative input terminal; the negative input terminal being connected to said telephone receiver, and the output terminal being connected to said telephone headset earphone;

b) a reference voltage connected to the positive input terminal of said amplifier;

c) a feedback path comprising resistors connected between said output terminal and said negative input terminal; and d) a Schottky diode circuit connected to said output terminal, and a semiconductor switch having a control gate connected to said Schottky diode, said semiconductor switch having a pair of output switched terminals, one output terminal connected to said resistor feedback path and the other output terminal connected to said reference voltage.

2. The circuit of claim 1, wherein said feedback path further comprises a pair of substantially equal-valued resistors connected in series, and said semiconductor switch one output terminal is connected between said pair of resistors.

3. The circuit of claim 2, further comprising an electrolytic capacitor connected to said amplifier output terminal and to said telephone headset earphone.

4. The circuit of claim 3, further comprising a capacitor connected in series with said semiconductor switch terminals.

5. The circuit of claim 4 wherein said semiconductor switch further comprises a junction field effect transistor (JFET).

* * * * *